United States Patent Office 3,429,202
Patented Feb. 25, 1969

3,429,202
GEAR BOXES
Georges Camille Eugène Galicher, 19 Rue de Chartres, Neuilly-sur-Seine, France
Filed July 7, 1966, Ser. No. 563,589
Claims priority, application France, Aug. 19, 1965, 28,818
U.S. Cl. 74—740                                4 Claims
Int. Cl. F16h *5/28, 15/46;* G05g *11/00*

ABSTRACT OF THE DISCLOSURE

A transmission assembly is comprised of a main transmission capable of providing a plurality of selectable speed ratios and connected in series with a shiftable two-speed reduction gear unit, preferably of the planetary type. A pivotally mounted shift lever is provided for shifting both the main transmission and the reduction gear unit, the shift lever having two arms each terminating in an operating key and arranged so that the operating keys can alternatively engage the connecting arms for shifting the main transmission, the shift lever having means for actuating a control device for controlling the shifting of the reduction gear unit, thereby providing a second range of speeds with only one shift lever.

---

This invention relates to manual transmissions or mechanical gear boxes for motor vehicles of the class of automobiles.

Since continuous transmission or torque conversion does not exist in manual systems, it has already been proposed to associate a conventional transmission with a reduction gearing system which makes it possible to double the number of gears of the transmission.

Systems of this type which have been known up to the present time make it possible to obtain two overlapping speed ranges and entail two separate controls, one for the transmission and the other for the reduction gearing system. Furthermore, the reduction gearing system is subjected at the input end to the torque exerted by the conventional transmission in low gear or first speed and consequently must have substantial dimensions.

The object of the invention is to overcome these disadvantages.

The manual transmission in accordance with the invention essentially comprises in combination a conventional transmission with a reduction gear train which is coupled with the third motion shaft of said transmission and which is capable of transmitting power from said third motion shaft to a transmission shaft in two different gear ratios, the ratio of which is substantially equal to the product of the maximum gear ratio of the conventional transmission and of the mean gear ratio.

This characteristic feature makes it possible to obtain two speed ranges in sequence, namely two ranges which are so stepped that the lowest speed of the second range follows the highest speed of the first range. The ratio of the conventional transmission may therefore be low and the torques applied to the reduction gear train may be limited as a result, thereby making it possible to reduce the overall size of the transmission for an equal capacity.

The reduction gear train of the transmission according to the invention is advantageously constituted by an epicyclic planetary gear-train housed within a transmission case and comprising a sun-gear which is rigidly fixed to the third motion shaft of the conventional transmission, planet gears carried by a planet carrier which is rigidly fixed to the transmission shaft, and a ring gear carried by a shaft which is coaxial with the transmission shaft, a gear which is slidably keyed on said coaxial shaft for the purpose of either coupling said ring gear with said transmission shaft or of locking said ring gear with respect to said transmission case.

The movement of the third motion shaft of the transmission is then transmitted by direct engagement to the transmission shaft when said shaft is coupled with the ring gear whereas, when said ring gear is immobilized, the transmission of power is effected by the planet gears in a speed-reduction ratio which is substantially equal to the product of the maximum reduction ratio of the conventional transmission and of the mean reduction ratio.

The conventional transmission and the reduction gear train of the transmission according to the invention can be actuated by means of a single lever which serves to shift the gears of the conventional transmission in two successive stages or over two consecutive ranges while effecting at the same time the operation of the reduction gear unit in the corresponding direction at the time of shifting from one range to the other.

In one form of embodiment of the invention, the single control lever is pivotally mounted in a case and guided in its transverse and longitudinal movements by a gate which is of conventional type but which is provided, in addition to the reverse gear recess, with a number of recesses which is double the number of the gears or speeds of the conventional transmission, said control lever being extended beyond its center of pivotal motion by a fork having two arms which each terminate in an operating key, each operating key being adapted to actuate successively and in unitary sequence a same series of connecting arms which control the shifting of gears of the conventional transmission and said single control lever being adapted to cooperate with a device for controlling the reduction gear unit in an intermediate position of said control lever between a position in which one of said operating keys actuates the last connecting arm of the series and a position in which the other operating key in turn actuates the first connecting arm of the series.

Said control device can be constituted by a micro-switch housed within the casing in which the control lever is pivotally mounted and actuated by a cam which is integral with said lever, said micro-switch being adapted to control a circuit for the dependent operation of the reduction gear unit.

Similarly, two additional micro-switches can be provided for initiating automatic clutch disengagement during operation of the reduction gear unit (in dependence on the transverse movement of the control lever) and at the time of each gear shift (in dependence on the longitudinal movements of the control lever).

One form of embodiment of the invention is illustrated by way of example in the accompanying drawings, in which:

FIG. 4 is a plan view of the gear shift gate of said control unit.

Figure 1:
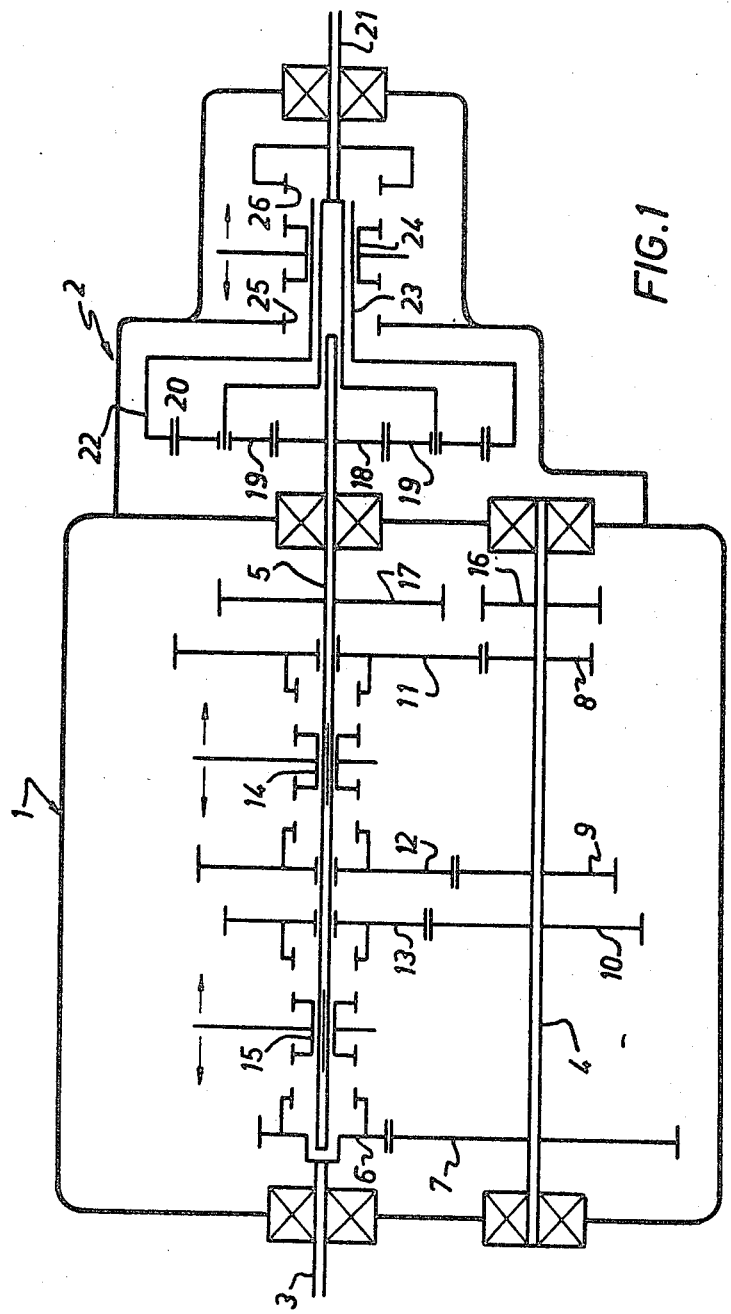
FIG. 1 is a diagrammatic presentation of the transmission according to the invention.

In this form of embodiment, the transmission is constituted by the combination of a gear box or transmission case 1 of conventional type and a reduction gear unit 2 comprising an epicyclic planetary gear train.

The four-speed transmission case 1 comprises a drive shaft 3, a countershaft 4 and a third motion shaft 5 which is in alignment with the drive shaft 3. The drive shaft 3 is coupled with the countershaft 4 by means of constant mesh pinions 6 and 7. Pinions 8, 9 and 10 which are keyed on the countershaft 4 are engaged respectively with pinions 11, 12 and 13 which are freely mounted on the third motion shaft 5. By means of two sliding pinions 14 and 15 which are slidably keyed on the third motion shaft 5, said third motion shaft can be selectively coupled in rotation with the pinions 11, 12, 13 or 6, thereby providing four different transmission ratios between the drive shaft 3 and the third motion shaft 5 in a manner which is well known per se. Similarly, a reverse speed is provided by means of two pinions 16 and 17 which are keyed respectively on the countershaft 4 and third motion shaft 5 and which can be coupled by means of an intermediate pinion, not shown. The sliding pinions can naturally be equipped with synchronizers.

The reduction unit 2 with epicyclic planetary gear train consists of a sun-gear 18 which is keyed on the end of the third motion shaft 5, planet gears 19 carried by a planet carrier 20 which is integral with a transmission shaft 21, said shaft being in alignment with the third motion shaft 5, a ring gear 22 carried by a shaft 23 which is coaxial with the transmission shaft 21 and mounted to to rotate freely with respect to this latter, and a sliding gear 24 which is slidably keyed on said coaxial shaft 23, said sliding gear being adapted to engage either with a stationary set of teeth which is rigidly fixed to the reduction unit casing or with a set of teeth 26 which is integral with the transmission shaft.

It is apparent that the transmission shaft 21 meshes directly with the third motion shaft 5 when the sliding gear 24 engages with the set of teeth 26 whereas, when said sliding gear engages with the stationary set of teeth 25, the movement of rotation of the third motion shaft is transmitted by the planet carrier 20 in a predetermined speed-reduction ratio. In accordance with the invention, this ratio corresponds substantially to the product of the maximum gear ratio of the transmission 1 and of the mean gear ratio.

Under these conditions, if the four speeds or gears of the conventional transmission are used in sequence when the reduction unit is located in the speed-reduction position, following which the same four speeds or gears are used in sequence when the reduction unit is located in the direct-engagement position, eight conventionally stepped speeds are accordingly obtained in sequence.

Figure 2:
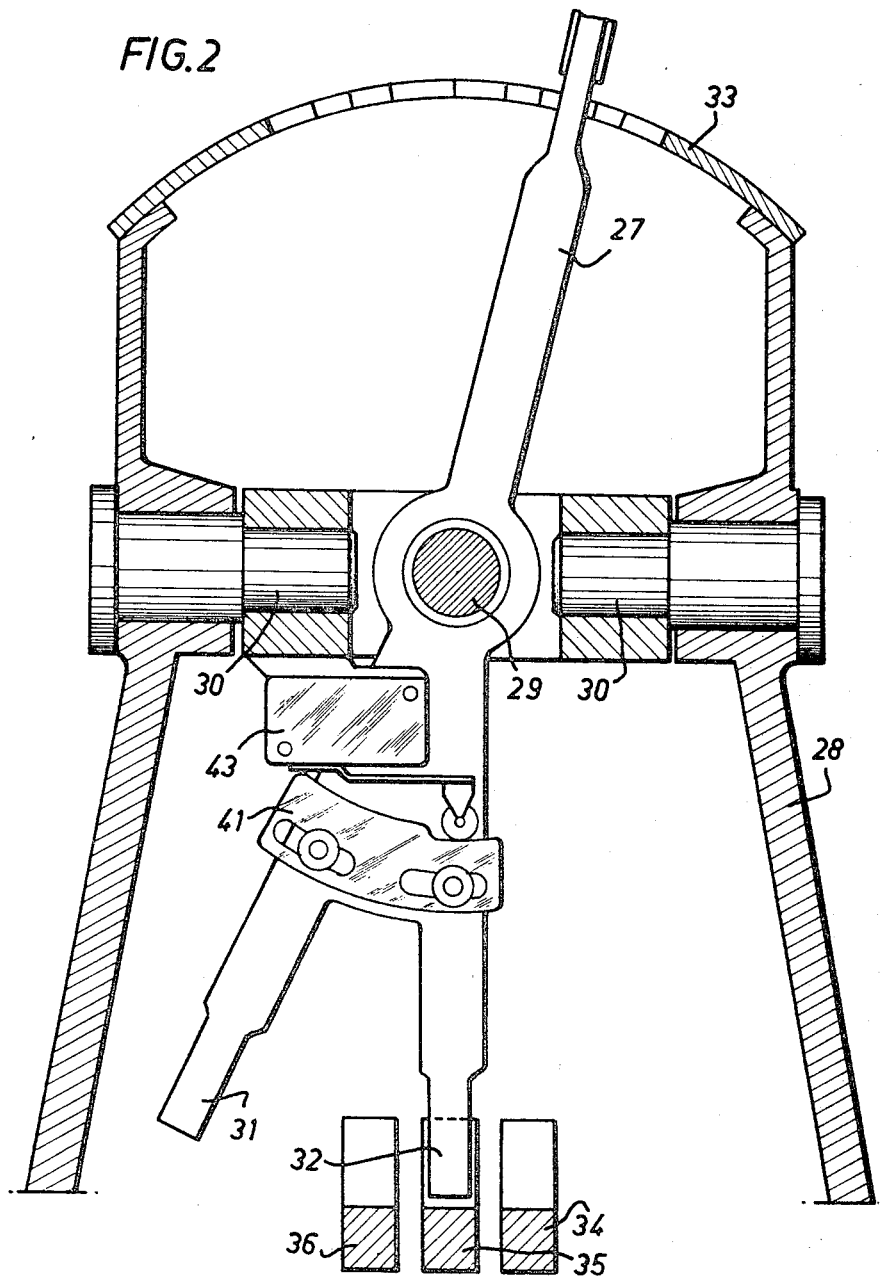
FIG. 2 is a simplified cross-sectional view of the control unit with a single control or gear-shift lever.
Figure 3:
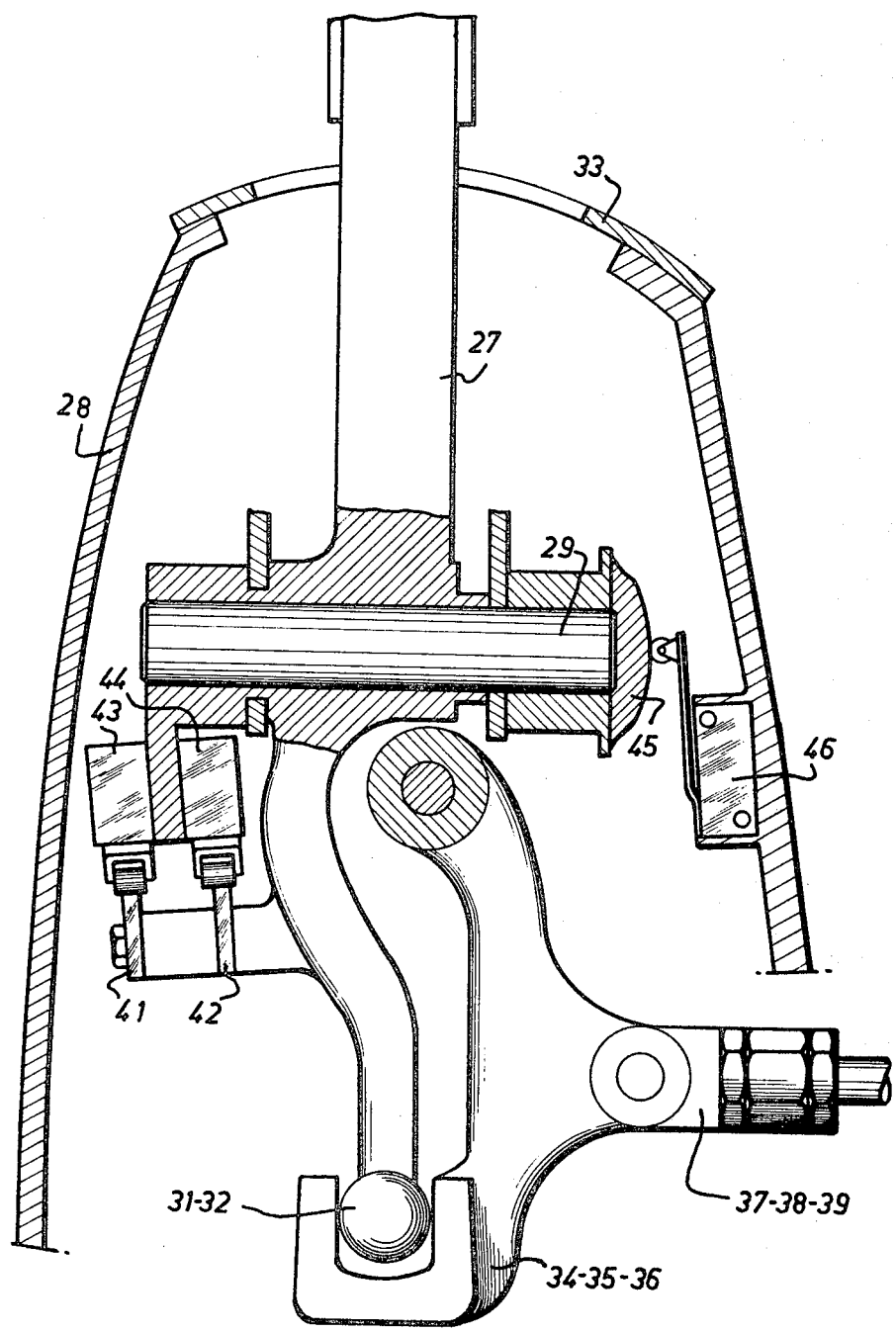
FIG. 3 is a longitudinal sectional view of said control unit.

The device which makes it possible to shift through the eight speeds in sequence and also into reverse by means of a single control lever is illustrated in FIGS. 2 to 4.

Said device comprises a single control lever 27 which is pivotally mounted within a case 28 on a cardan-type universal joint comprising a longitudinal pin 29 and two aligned transverse journal-bearings 30.

The lever 27 terminates inside the case 28 in a fork having two arms which are located in a same transverse plane and each terminate in an operating key respectively designated by the reference numerals 31 and 32. Said lever is guided both in the transverse and longitudinal movements thereof by a gate 33 which is provided with nine recesses as designated by the references 33a to 33i. The recess 33a corresponds to reverse speed and the recesses 33b to 33i respectively to first to eighth speeds. The first to the fourth speeds on the one hand and the fifth to eighth speeds on the other hand are distributed in two groups which are spaced transversely for the reason which will be explained hereinafter.

When the lever 27 is caused to carry out transverse movements, the operating keys 31 and 32 pass opposite the connecting arms 34, 35 and 36 which are connected by means of linkages 37, 38 and 39 respectively to the sliding gear (not shown) which controls the reverse speed and to the sliding gears 14 and 15 which control the first to the fourth gears of the transmission 1, said sliding gears being actuated by the longitudinal movements of the lever 27 in the corresponding recesses of the gate 33.

The lever 27 is additionally provided within the case 28 with two cams 41 and 42 which are adapted to cooperate respectively in response to the transverse movements of the lever with two micro-switches 43 and 44 which are mounted on the body of the universal joint. In addition, a cam 45 which is carried by the universal joint body is adapted to cooperate in response to the longitudinal movements of the lever with a micro-switch 46 mounted on the case 28. The micro-switch 43 supplies current, for example, to an electrovalve (not shown in the drawings) which is mounted on the transmission and which is intended to control the operating fork of the sliding pinion 24 of the reduction unit 2. Similarly, the micro-switches 44 and 46 operate the clutch.

The device operates as follows:

When the lever 27 is placed opposite to the recess 33a of the gate 33, the operating key 31 is located opposite to the connecting arm 34 and makes it possible to obtain the reverse gear combination. By displacing the lever transversely in front of the pair of recesses 33b–33c, 33d–33e, 33f–33g and 33h–33i, and by passing through the longest distance between the groups of recesses 33b to 33e and 33f to 33i the operating key 31 then the key 32 are brought in turn in front of the connecting arms 35 and 36, which accordingly makes it possible to obtain twice in succession the combinations of first to fourth speeds of the transmission 1; however, at the same time, as the lever passes through the space between the two groups of recesses, the cam 41 has actuated the micro-switch 43, which has had the effect of reversing the reduction unit 2, with the result that the combinations obtained by means of the operating key 31 are stepped down by the reduction gear unit 2 in the speed-reduction position whilst the combinations obtained by means of the operating key 32 are transmitted without modification to the transmission shaft 21 by the reduction gear unit 2 in the direct-engagement position. There are thus obtained eight suitably stepped speeds as has previously been stated.

It will be noted that the wider space which exists between the two groups of recesses of the gate 33 prevents the operating key 32 from coming opposite the connecting arm 34. Thus, reverse gear can only be obtained by means of the operating key 31 when the lever 27 is in an end position beyond the first speed position, thereby preventing any risk of errors of operation.

Clutch disengagement is carried out automatically by the cam 45 and the micro-switch 46 as the gears are shifted and by the cam 42 and the micro-switch 44 at the time of operation of the reduction gear unit.

As is already known per se, spring-loaded stops (not shown) will serve to limit the transverse movements of travel of the shift lever, in the reverse gear position at one end and in the position corresponding to the top speed range at the other end.

It will be apparent that the invention is not limited to the form of embodiment which has been described and illustrated by way of example and that a large number of alternative forms are available to those skilled in the art without thereby departing either from the scope or the spirit of the invention.

What I claim is:

1. A transmission, particularly for motor vehicles, comprising in combination:
   an input shaft, an output shaft and a third shaft;
   a plurality of sets of change speed gears mounted in association with said input shaft and said third shaft and selectively operable to provide at least one reverse speed ratio and a plurality of forward speed ratios between said input shaft and said third shaft;
   a series of connecting arms for shifting said sets of change speed gears;
   a reduction gear unit coupled between said third shaft and said output shaft and capable of transmitting power from said third shaft to said output shaft in at least two different speed ratios;
   a pivotally mounted shift lever connected for shifting said sets of change speed gears and also shifting said reduction gear unit, a gate for guiding transverse and longitudinal movements of said shift lever, said gate including at least one reverse gear recess and a number of additional recesses equal to at least twice the number of forward speed ratios provided by said sets of change speed gears, said shift lever having two arms each terminating in an operating key and arranged so that said operating keys can alternatively engage said connecting arms and each operating key can actuate said connecting arms in succession;

a control device for controlling shifting of said reduction gear unit; and actuating means for actuating said control device when said shift lever is located between a position in which one of said operating keys actuates the last connecting arm of the series and a position in which the other operating key actuates the first connecting arm of the series.

2. A transmission as claimed in claim 1, wherein said reduction gear unit is constituted by an epicyclic planetary gear train housed within a transmission case and comprising a sun-gear rigidly fixed to said third shaft, planet gears carried by a planet carrier which is rigidly fixed to said output shaft, a ring gear carried by a further shaft which is coaxial with said output shaft, and a gear slidably keyed on said further shaft for alternatively coupling said ring gear with said output shaft and locking said ring gear with respect to said transmission case.

3. A transmission as claimed in claim 1, wherein said control device comprises a switch housed within a casing in which the shift lever is pivotally mounted and said actuating means comprises a cam mounted on said shift lever for actuating said switch, said switch being adapted to control a circuit for shifting said reduction gear unit.

4. A transmission as claimed in claim 3, including two additional switches, one of said additional switches being adapted for initiating clutch disengagement during shifting of the reduction gear unit in response to the transverse movement of the shift lever, the other additional switch being adapted for initiating clutch disengagement at the time of each gear shift in response to the longitudinal movements of the shift lever.

References Cited

UNITED STATES PATENTS

| | | | |
|---|---|---|---|
| 2,252,158 | 9/1941 | Bixby | 74—473 |
| 2,465,885 | 3/1949 | Koster et al. | 74—740 |
| 2,592,210 | 4/1952 | Swennes | 74—740 |
| 2,663,199 | 12/1953 | Harrison | 74—740 X |
| 2,748,910 | 6/1956 | Klecker | 74—335 X |
| 2,815,974 | 12/1957 | Stubbe | 74—785 X |
| 2,923,176 | 2/1960 | Randt | 74—740 |
| 3,049,934 | 9/1962 | Butler et al. | 74—473 X |
| 3,093,008 | 6/1963 | Wight | 74—335 |

DONLEY J. STOCKING, *Primary Examiner.*

L. H. GERIN, *Assistant Examiner.*

U.S. Cl. X.R.

74—335, 473, 480